(12) United States Patent
Abusch-Magder

(10) Patent No.: US 9,374,714 B2
(45) Date of Patent: Jun. 21, 2016

(54) METHODS OF CONFIGURING CELLS IN A NETWORK USING NEIGHBORHOODS AND METHOD OF DYNAMICALLY CONFIGURING CELLS IN A NETWORK USING NEIGHBORHOODS

(75) Inventor: David Abusch-Magder, Maplewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1085 days.

(21) Appl. No.: 11/385,881

(22) Filed: Mar. 22, 2006

(65) Prior Publication Data

US 2007/0225029 A1   Sep. 27, 2007

(51) Int. Cl.
  *H04W 72/06*  (2009.01)
  *H04W 24/02*  (2009.01)
  *H04W 16/18*  (2009.01)

(52) U.S. Cl.
  CPC .............. *H04W 24/02* (2013.01); *H04W 72/06* (2013.01); *H04W 16/18* (2013.01)

(58) Field of Classification Search
  USPC .......................................... 370/232; 455/424
  See application file for complete search history.

(56) References Cited

U.S. PATENT DOCUMENTS

| | | | | |
|---|---|---|---|---|
| 5,509,051 A * | 4/1996 | Barnett et al. | ................ | 455/443 |
| 5,987,099 A * | 11/1999 | O'Neill et al. | ................ | 455/436 |
| 6,094,580 A * | 7/2000 | Yu et al. | ........................ | 455/446 |
| 6,223,037 B1 * | 4/2001 | Parkkila | ........................ | 455/434 |
| 6,961,559 B1 * | 11/2005 | Chow et al. | ................. | 455/414.1 |
| 7,136,638 B2 * | 11/2006 | Wacker et al. | ................ | 455/424 |
| 2001/0008523 A1 * | 7/2001 | Song | ............................ | 370/335 |
| 2002/0142788 A1 * | 10/2002 | Chawla et al. | ................ | 455/504 |
| 2003/0013443 A1 * | 1/2003 | Willars et al. | ................ | 455/432 |
| 2003/0086437 A1 * | 5/2003 | Benveniste | .................. | 370/461 |
| 2003/0171132 A1 * | 9/2003 | Ho et al. | ........................ | 455/522 |
| 2003/0220109 A1 * | 11/2003 | Jami et al. | ..................... | 455/437 |
| 2004/0166864 A1 * | 8/2004 | Hill et al. | ...................... | 455/450 |
| 2006/0073791 A1 * | 4/2006 | Senarath et al. | ........... | 455/67.13 |
| 2006/0235673 A1 * | 10/2006 | Gonguet et al. | ............... | 703/14 |
| 2006/0262750 A1 * | 11/2006 | Walton et al. | ................. | 370/329 |

OTHER PUBLICATIONS

Siemens, 2002, 3G Wireless Standards for Cellular Mobile Services, pp. 1-20.*

* cited by examiner

*Primary Examiner* — Omar Ghowrwal
(74) *Attorney, Agent, or Firm* — Harness, Dickey & Pierce, P.L.C.

(57) ABSTRACT

In a method of configuring a cell for operation in a wireless communication network, a determinable neighborhood of cells within the network is used for cell configuration. In the method, a neighborhood of cells is selected for the given cell to be configured. Data is acquired from cells of the selected neighborhood, and configuration settings for the given cell are determined based on the acquired data.

26 Claims, 9 Drawing Sheets

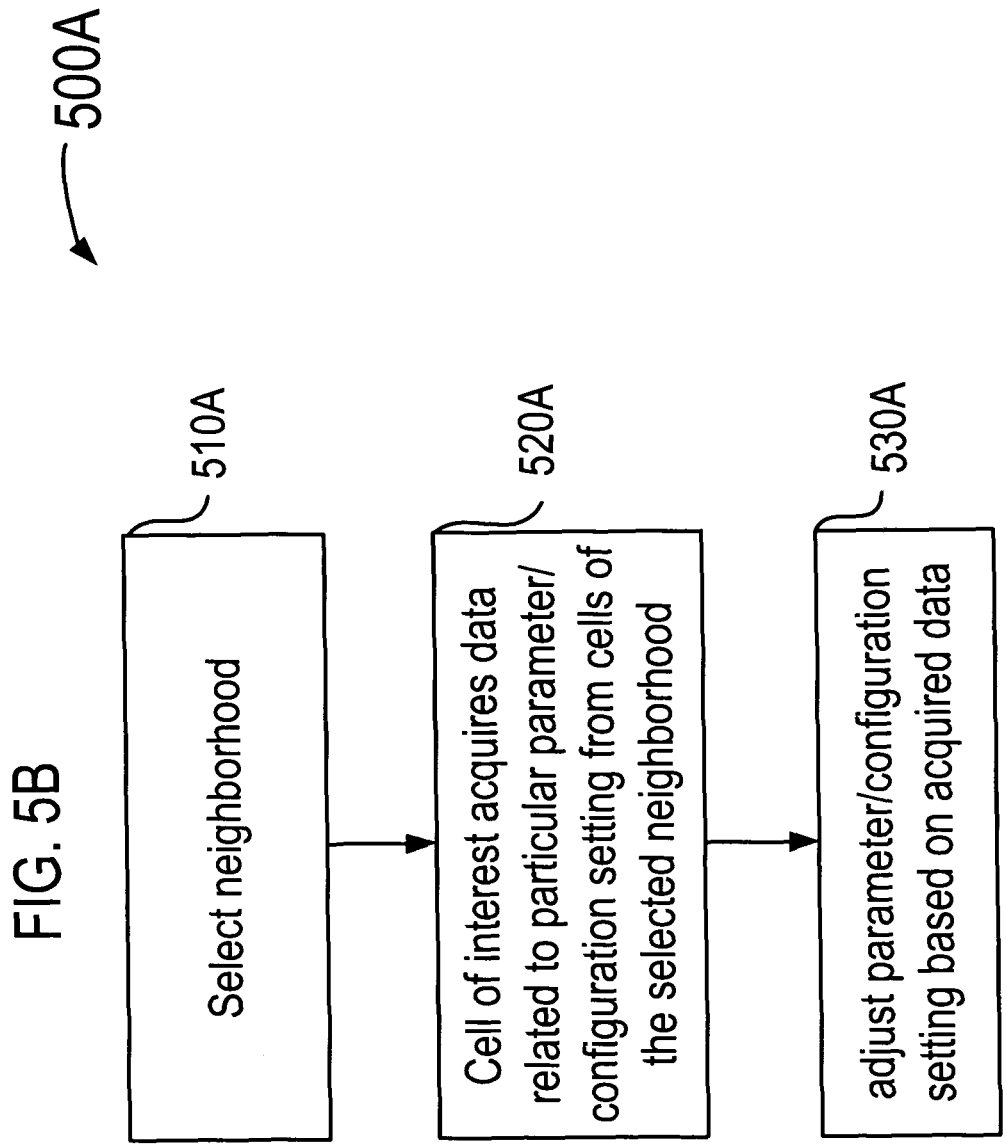

METHODS OF CONFIGURING CELLS IN A NETWORK USING NEIGHBORHOODS AND METHOD OF DYNAMICALLY CONFIGURING CELLS IN A NETWORK USING NEIGHBORHOODS

CROSS-REFERENCE TO RELATED APPLICATIONS

This application is related to U.S. patent application Ser. No. 11/072,439, which is now U.S. Pat. No. 7,639,988 B2 to David Abusch-Magder et al., filed Mar. 7, 2005 and entitled "METHODS OF SIMPLIFYING NETWORK SIMULATION"; and to U.S. patent application Ser. No. 11/385,880, which is now U.S. Pat. No. 7,941,135 B2 to David Abusch-Magder, filed Mar. 22, 2006 and entitled "METHODS OF PERFORMING LIVE MONITORING OF A WIRELESS COMMUNICATION NETWORK". The entire contents of each of these related applications are hereby incorporated by reference herein.

BACKGROUND OF THE INVENTION

1. Field of the Invention

Example embodiments of the present invention relate in general to methods of configuring a cell in a wireless communication network.

2. Description of the Related Art

A wireless network generally is divided into a multiplicity of cells with each cell having at least one base station. A user within the cell wishing to send information establishes communication with a base station in the cell. This receiving base station communicates typically with a mobile switching center, another base station or other network entity that, in turn, relays the information through the network to another base station or network, e.g., a public switch telephone network or the internet, where the intended recipient is located.

The efficient use of network resources requires a multiplexing scheme in which communication from numerous users (often as many as 200 users per cell) are being handled simultaneously. Similarly, each mobile at times receives a decodable signal from more than one base station (typically 3, sometimes 6 or more). A variety of protocols has been developed to achieve such goals. Generally, in accordance with the protocol being employed, identification and operation parameters are assigned to each base station and to each user.

A base station identifies itself by transmitting on the pilot channel with a pseudo random noise (PN) pattern beginning at an assigned PN offset. Users wishing to initiate communication search for a signal on a pilot channel and identify a base station for communication by the PN offset of the sensed pilot channel transmission. Other protocols such as universal mobile telecommunication systems (UTMS) have their own identification parameters such as scrambling codes.

Various parameters, in addition to identification parameters, are also an essential part of network management. Within any discrete geographic region the base stations present are assigned a limited number of carrier frequencies. A suitable choice of other parameters is also important. For example, the transmission intensity of a base station or of an individual user often can have a profound effect on the interference generated for other base stations or users who are not the intended receiver of the transmission, and on the probability of transmission reception by the intended receiver. A variety of other operating parameters such as antenna orientation, hand-off thresholds, traffic power limits and pilot power fraction of total amplifier power can affect network function.

In establishing a communications network, various parameters are set for each base station, often numbering as many as 1000 base stations for a metropolitan area. Thus, significant planning and configuration associated with these parameters typically precede the establishment of the network. Although at least some of these parameters can be adjusted as the network evolves, the incipient choices are carefully made to avoid network failure or to avoid an excessive duration and/or area of unacceptable operation.

Even after a network is operating, additional base stations can be added as the network expands. Moreover, due to changes in the network, one or more parameters of an existing base station in the network may need to be adjusted. These additional or existing base stations have various parameters that may thus require configuration or adjustment. A poor choice of parameters to set for initial operation or to adjust during operation due to a network change has the potential for causing network failure and/or unacceptable degradation in network efficiency or resources.

The efforts and concomitant costs associated with planning, configuring, adjusting and/or expanding a network are substantial. Significantly, there is an accelerating growth trend in the number and density of cells in wireless networks. Accordingly, the fraction of revenues service providers expend on to configure and plan their networks is expected to grow. The situation may be further aggravated as demand for higher bandwidth services increases and as wireless data and voice services become ubiquitous.

Traditionally, each time new equipment such as a cell is added to the network, or an existing cell requires a change to one or more parameters due to a change in the network, the new or existing equipment must be manually configured. The configuration of other network entities (other cells, MSC or other centralized controller) must also be adjusted to account for this new equipment. This manual process typically requires multiple changes and is expensive to implement (in part due to the requirement for human intervention).

This time and cost problem is getting worse as networks develop and evolve. For example, changes in usage patterns and services are forcing networks to have more cells that are spaced closer together. This is particularly being driven by (a) the desire to have in-building coverage means more cells covering less territory, and (b) the attempts made to provide high speed data coverage over larger areas. In order to obtain these high speeds, improved signal to noise ratios are needed, which limits the geographic distance between the user and the cell. Service providers are thus increasingly being required to install more cells closer to each other.

As a consequence, installation and maintenance costs are becoming a larger fraction of the service provider's expenditures. If not reduced or controlled, these costs can limit investment for new services. Moreover, the potential for mistaken configuration rises as the network complexity increases with the number of cells in the network. Erroneous configuration of a cell is more likely where substantial human intervention is required.

SUMMARY OF THE INVENTION

An example embodiment of the present invention is directed to a method of configuring a cell for operation in a wireless communication network with a determinable neighborhood of cells within the network. In the method, a neighborhood of cells is selected for the given cell to be configured.

Data is acquired from cells of the selected neighborhood, and configuration settings for the given cell are determined based on the acquired data.

Another example embodiment of the present invention is directed to a method of configuring a cell for operation in a wireless communication network with a determinable neighborhood of cells within the network. In the method, a neighborhood of cells is selected for the given cell to be configured. The selection of the given neighborhood is based on a particular parameter to be configured for the given cell. Data is acquired from cells of the selected neighborhood. The data is related to the particular parameter to be configured for the given cell. The given cell is configured based on the acquired data.

Another example embodiment of the present invention is directed to a method of dynamically configuring a cell during operation in a wireless communication network with a determinable neighborhood of cells within the network. In the method, a neighborhood of cells is selected for the given cell to be configured. Data is acquired from cells of the selected neighborhood. One or more configuration settings of the given cell are adjusted based on the acquired data.

Another example embodiment of the present invention is directed to a method of dynamically configuring a cell during operation in a wireless communication network with a determinable neighborhood of cells within the network. In the method, a neighborhood of cells is selected for the given cell to be configured. The selection of the given neighborhood is based on a particular parameter to be configured for the given cell. Data is acquired from cells of the selected neighborhood. The data is related to the particular parameter to be configured for the given cell. The particular parameter of the given cell is adjusted based on the acquired data.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

FIG. 5B is a flowchart for describing a method of dynamically configuring a cell during operation in a wireless communication network with a determinable neighborhood of cells within the network, in accordance with an example embodiment of the present invention.

DETAILED DESCRIPTION OF THE EXAMPLE EMBODIMENTS

Figure 1:
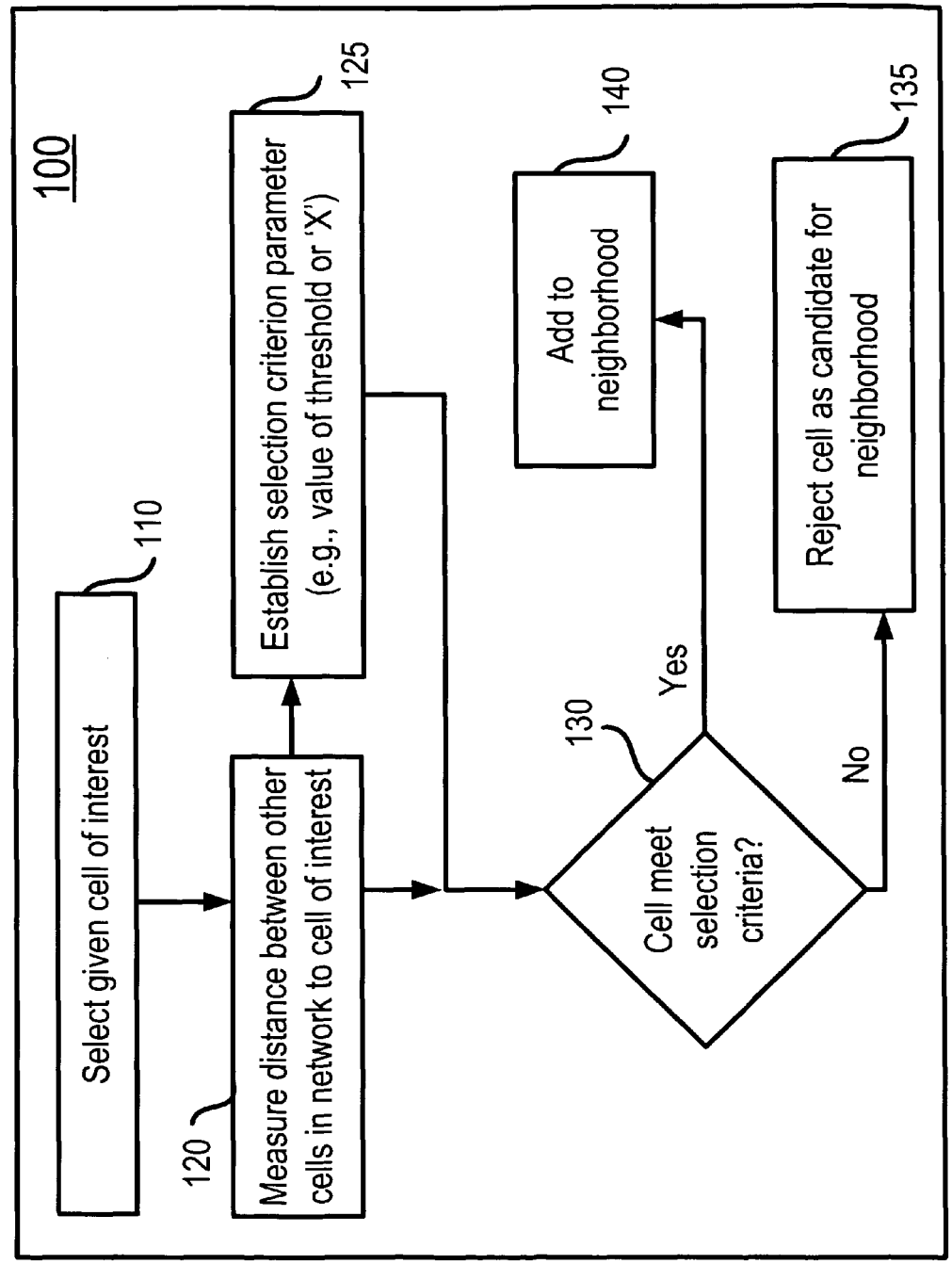
FIG. 1 is a flowchart for describing use of a distance measure and distance-based threshholding for determining a neighborhood to be used for configuration of a cell in a network, in accordance with an example embodiment of the present invention.

Although the following description relates to a network based on one or more of CDMA (IS95, CDMA2000 and various technology variations), UMTS, GSM, 802.11 and/or related technologies, and will be described in this example context, it should be noted that the example embodiments shown and described herein are meant to be illustrative only and not limiting in any way. As such, various modifications will be apparent to those skilled in the art for application to communication systems or networks based on technologies other than the above, which may be in various stages of development and intended for future replacement of, or use with, the above networks or systems.

As used herein, the term mobile may be synonymous to a mobile user, user equipment (UE), user, subscriber, wireless terminal and/or remote station and may describe a remote user of wireless resources in a wireless communication network. The term 'cell' may be understood as a one or more base stations, access points, and/or any terminus of radio frequency communication. Although current network architectures may consider a distinction between mobile/user devices and access points/base stations, the example embodiments described hereafter may generally be applicable to architectures where that distinction is not so clear, such as ad hoc and/or mesh network architectures, for example.

The example embodiments of the present invention are directed to methods of configuring a cell in a wireless communication network with a determinable neighborhood of cells within the network. As will be described below, and in general, the local nature of wireless radio propagation may be leveraged in order to reduce the number of resources needed to configure a cell. One motivation behind this locality property or approach may be understood as follows: cells located "far enough" apart should exert negligible effects on each other. For example, cells on opposite sides of a large metropolitan area should have little effect on each other.

This locality property may be exploited in an effort to achieve significant performance gains in cell configuration even within moderately sized markets. When trying to acquire data to configure a cell of interest, one can utilize desirable data acquired from a "neighborhood" around the cell of interest that will be representative of the full network.

To provide context for the example embodiments described herein, the inventors provide an overview of a particular network optimization problem, generally discuss algorithms that may be used to demonstrate locality simplifications, and provide an introduction to distance measures and neighborhood selection criteria.

Cell Site Selection and Cell Deletion

Cell deletion, a variant of the well-known cell site selection problem, is an example of a computationally difficult wireless optimization problem whose solution generally requires numerous conventional large-scale network simulations. Cell deletion asks how the designer should remove k cells from a network while maximizing a network performance measure such as network coverage. This problem is relevant in planning network upgrades, when new technologies often improve network performance so that fewer cells are needed to achieve previous performance levels. The application of the neighborhood simplification to this problem exemplifies the utility of the neighborhood concept in another context, and may help guide the construction of example distance metrics and selection criteria.

Distance Measures

The effectiveness of locality-based network optimization may be influenced by the definition of "distance" between cells. It is this notion of distance that permits a neighborhood to be defined around each cell. Generally, a distance measure may be understood as a function that "measures" the "distance" between two cells. The distance need not be a simple measure of the geographic separation, but rather may be a generalization that should capture how much cells affect each other. A desirable distance measure would conclude that cells having a relatively large effect on each other are closer.

The geographic distance between two cells may be the simplest measure of distance. While cells that are geographically farther apart will tend to have less effect on each other using this distance measure, simple geographic distance does not incorporate the fundamental interaction between cells—radio frequency radiation.

Radio frequency effects should thus be accounted for in order to accurately measure the distance between cells. The path loss (i.e., a measure of an attenuation signal between two points) at broadcast frequencies may serve as a desirable measure of distance to determine a given neighborhood for a cell of interest, for example. The path loss may be measured between the cell of interest and one or more points in the vicinity of another cell, and a score may be determined for other cells based on the path loss of the points in their vicinity in order to determine cells of the neighborhood.

For example, the path loss may be measured by comparing the power received from another cell by the cell of interest to the power broadcast by that other cell. In another example, the path loss may be measured by comparing the power received from the cell of interest at mobiles owned by another cell. In a further example, the path loss may be computed by measuring power from the cell of interest at points in the vicinity of another cell. The points may or may not be the mobiles owned by the other cell. In another example, a plurality of measurements can be combined into a single valued measure to be evaluated against the threshold.

Cells that have greater path loss from the cell of interest would be considered "farther", regardless of the geographic distance between cells. A neighborhood may then be defined as those cells that have a path loss value below some threshold (which may be set in advance or based on another criterion) from the cell of interest, while those cells with path loss value greater than the threshold would not be included in the neighborhood. A path loss-based distance measure would thus incorporate the local terrain, the clutter and the propagation environment. Accordingly, once cells having a path loss metric less than the threshold are selected as cells of the neighborhood, the data may be acquired from these neighborhood cells in order to configure the cell of interest.

However, given the frequency division duplexing used to separate the forward and reverse links in most cellular systems, it is not the forward link broadcast of one cell that interferes with another cell, but rather the interference on the reverse link. Accordingly, a modified distance measure that incorporates the deleterious reverse link interference may be desirable when assessing inter-cell interaction. By measuring the power of the reverse link interference at cell of interest A due to the mobiles in communication with another cell B, a distance measure between the two cells may thus be defined. This measure, like the reverse interference, may be dependent on the number of mobiles owned by cell B. By "owned", the cell (i.e., cell B) that is serving the mobile(s) may represent the mobiles' primary radio connection. Alternatively, any mobiles which may be in communication with a given cell (such as cell B in this example), could also represent mobiles that may be owned by cell B.

This "distance" measure, like reverse link interference, is not symmetric; the mobiles served and/or owned by cell A may have a larger effect on cell B than the effect of those mobiles served by cell B have on cell A. Yet, a distance measure based on a reverse link interference definition may be applicable to a variety of different air interfaces, and may naturally incorporate the differing interactions between cells inherent in each technology.

Distance Measures & Selection Criteria for Neighborhood Determination

When performing an application such as configuring cell A in a network for operation, one may only need to consider the cells that are close enough to A to be relevant. This may or may not be related to the actual geographic distance between the cells. For example, a distance measure may be used to rank the other cells and their importance to the cell of interest. The selection criterion (also referred to as threshholding criterion) determines how many members of that ranked list to include as neighbors of the cell of interest.

In the following examples, two different distance measures and selection criteria are presented. These examples illustrate the impact of both the distance measure and selection criterion on determining neighborhoods to be used for performing applications such as configuring a cell for operation in a wireless communication network.

As to be illustrated in more detail hereafter, cells for a given neighborhood may be selected using several possible distance measures. In an example, defining a neighborhood including the given cell of interest so as to configure the cell for network operation may be determined based on geographic distance information or another distance metric from the cell of interest. Distances measurements may be used and compared to another distance metric (i.e., selection criterion parameter) to determine a score for each cell. In an example, a score for other cells in addition to the given cell of interest may be thus determined as a function of the geographic distance of the other cells from the given cell of interest. Based on their scores, given cells may then be selected for the neighborhood.

As previously discussed, measured path loss data between a given cell of interest and one or more points in the vicinity of another cell may also be used as the distance measure to determine a score for each cell in determining the neighborhood. Further, reverse link information of those mobiles "owned" by a cell being evaluated as a possible neighbor of the cell of interest may be used to determine the neighborhood that is selected for live monitoring.

FIG. 1 is a flowchart 100 for describing use of a distance measure and a selection criterion for determining a neighborhood usable for an example cell configuration methodology, in accordance with an example embodiment of the present invention. As shown in FIG. 1, a given cell in the network may be selected (110). In order to determine the neighborhood surrounding the selected cell, a selection criterion may be established (125) using a distance measure 120 (be it a geographic measure or another measure) to determine the neighbors of the cell of interest (140).

Thus, in one example a selection criterion parameter may be embodied as a set number of X cells in the neighborhood of the cell of interest that are closest; this may be appropriate when using a geographic distance measure. Likewise "Top-X" might be used with a different distance measure such as a measurement based on path loss or reverse interference. Accordingly, if a given cell meets the chosen selection criteria (output of 130 is 'YES'), such as the closest X cells (independent of the specific distance measure chosen) it is selected (140) as a cell of the neighborhood, i.e., as a neighbor in the neighborhood of the cell to be configured, and/or additionally to be simulated/optimized for a given application. Those not satisfying the selection criterion (output of 130 is 'NO') are rejected (135). The value of X established for Top-X threshold can be varied based on the structure of the network and/or simulated based on the availability of computational resources, for example.

Accordingly, as discussed above, another method of determining the neighbors of a cell is to select the "top-X" closest cells as neighbors, where X is a pre-selected constant based on the structure of the network. But this "Top-X" methodology is not the only selection technique for neighborhood determination. For example, network inhomogeneity may make it desirable to have different neighborhood sizes for different cells that are to be configured. In an example, a cell to be configured in a dense, high-interference area may require more neighbors for accurate configuration than a cell in a sparse area, for example.

Figure 2:
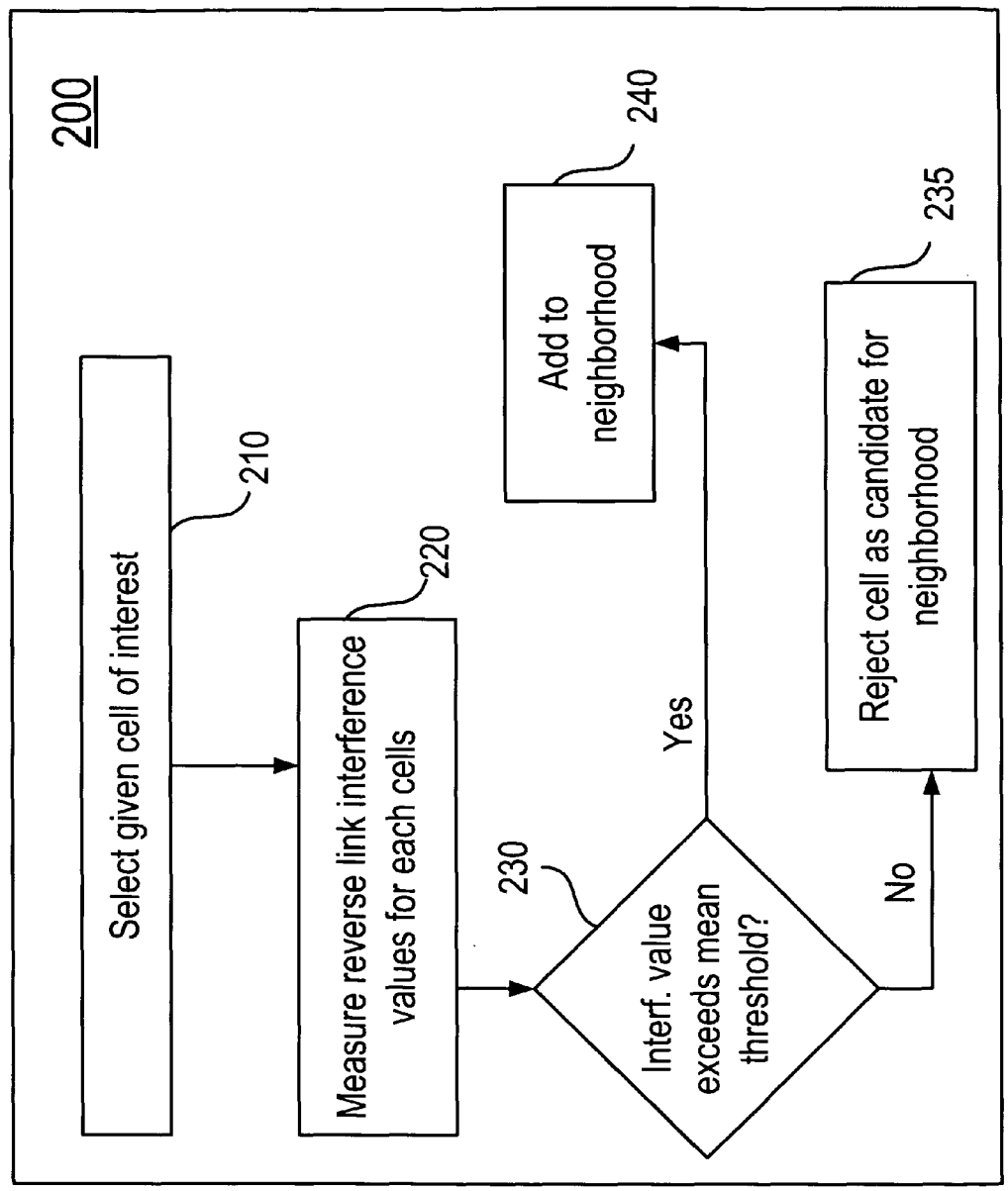
FIG. 2 is a flowchart for describing reverse link interference threshholding for determining a neighborhood to be used for configuration of a cell in a network, in accordance with an example embodiment of the present invention.

FIG. 2 is a flowchart 200 for describing reverse link interference threshholding for determining a neighborhood usable for an example cell configuration methodology, in accordance with an example embodiment of the present invention. Measuring cells based on reverse link interference information and choosing an appropriate selection criterion may provide a neighborhood that is not restricted to the closest geographic cells. Such a neighborhood may be a more desirable choice for certain cell configuration applications.

An interference distance measure and associated selection criterion may provide a more sophisticated methodology for defining neighbors than a distance based approach with "top-X" selection. As shown in FIG. 2, a given cell in the network may be selected (210) for evaluation. Reverse link interference values may be measured (220) for all mobiles owned by another cell that can be detected by the given selected cell. For example, if cell "A" is the cell to be evaluated, then its neighborhood will be determined. All possible other cells, i.e., cell "B", are considered as one of the "other cells" which may or may not be part of the neighborhood that is eventually determined to surround cell A. The reverse link interference at cell A caused by all mobiles in communication with cell B is determined. As previously discussed, reverse link interference refers to the radio signal(s) measured at cell A created by the mobiles in communication with cell B.

In the "mean reverse interference threshold" selection method each reverse link interference value may be compared to a reverse link interference threshold (230). The threshold is determined as a multiple of the mean value among cells with reverse link interference above the ambient noise floor. Cells whose measured reverse link interference values exceed the threshold (output of 230 is 'YES') may be selected (240) as cells comprising the neighborhood surrounding the selected cell A to be evaluated. This technique may be referred to as "reverse link interference with mean threshholding selection".

Similarly, distance-based measures may be used to rank cells as candidates for a neighborhood. Once the cells are ranked (such as by score) using the elected distance measure, the selection criterion, such as Top-X, etc, may be used to pare members from the ranked list as members to add to the neighborhood to be used for configuration of a cell of interest in the network.

Figure 3:
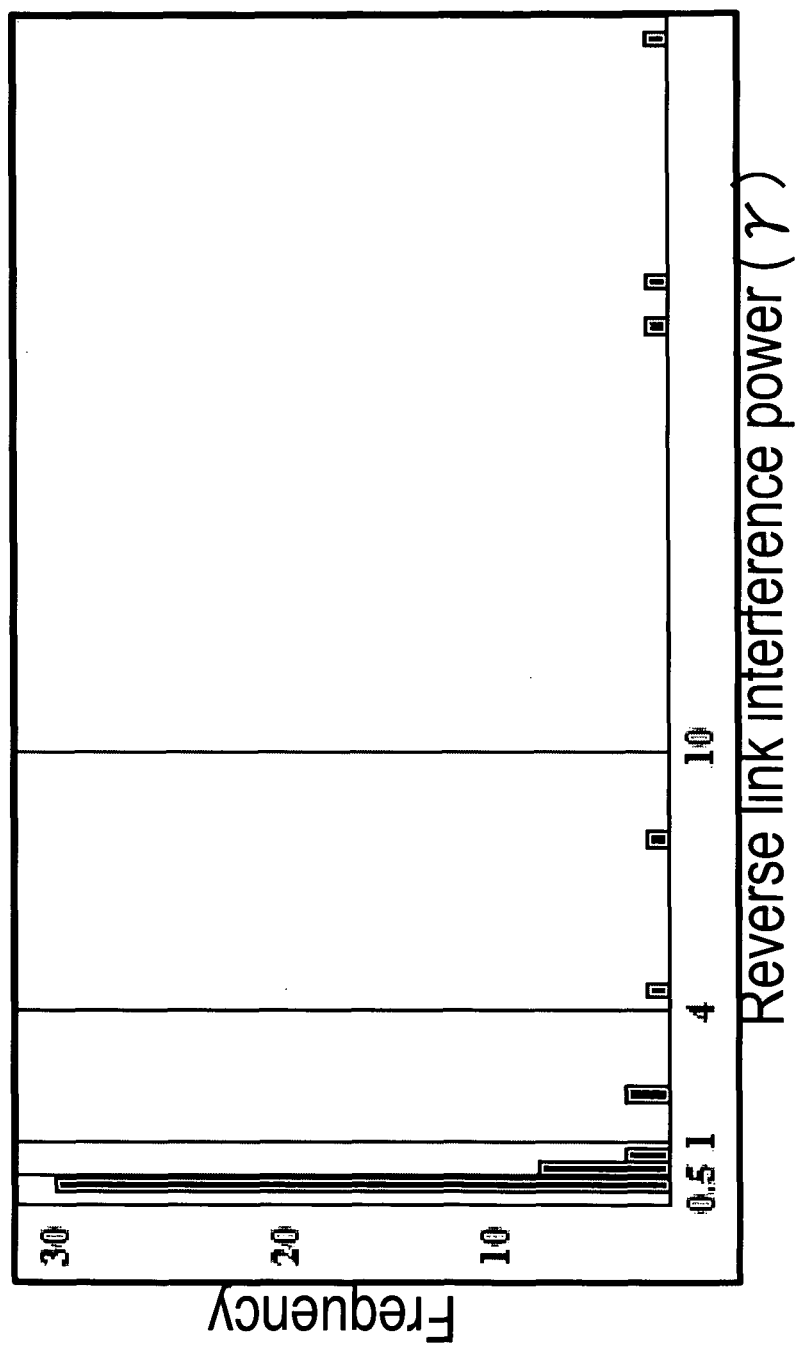
FIG. 3 is a histogram of interference power for a sample cell.

FIG. 3 is a histogram of interference power for a sample cell. The distribution of reverse link interference power (shown on a linear scale) is highly right-skewed. In other words, each cell in a network is only significantly interfered with by a small number of other cells in the network. This inherent property of wireless networks may enable neighborhoods around cells to be determined by simply selecting cells based on a threshold set to be some multiple $\gamma$ of the mean interference for cells whose interference exceed background noise, and defining the neighbors as those cells with interference greater than the threshold. In the histogram, thresholds for $\gamma$=0.5, 1, 4 and 10 are marked on the x-axis—a greater $\gamma$ results in fewer neighbors.

The reverse link interference power distribution for cells is heavily right-skewed, demonstrating that most of the interference at any cell is due to a relatively small number of other cells. By choosing an appropriate interference cut-off value and selecting all cells with interference scores greater than that value, one may thus obtain interference-based neighborhoods that are essentially independent of the total size of the network.

Accordingly, a selection criterion based on a threshold which is set to some multiple $\gamma$ of the linear mean of interference power for each cell may be a desirable alternative to "Top-X" selection with reverse interference power as a distance metric. Greater values of $\gamma$ will result in smaller neighborhoods. A cell-specific mean interference value is used instead of a global mean interference value because cells are often in significantly different interference environments.

Figure 4:
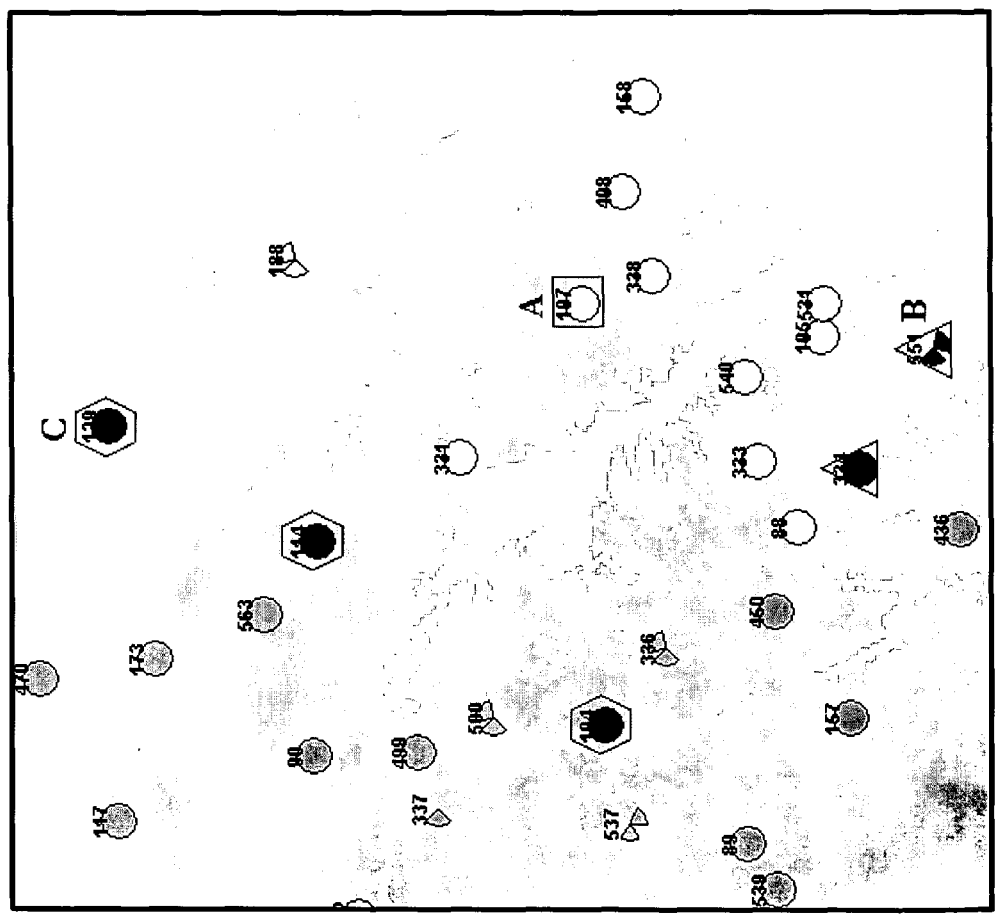
FIG. 4 is a topographic map to illustrate a comparison of neighborhoods determined by reverse link interference with mean threshholding selection and geographic distance with Top-X selection.

FIG. 4 is a topographic map to illustrate a comparison of neighborhoods determined by reverse link interference with mean threshholding selection and geographic distance with Top-X selection techniques. FIG. 4 illustrates a section of a realistic network with topography indicated in grayscale. The cell of interest that is enclosed within a square is labeled A. "Neighboring" cells chosen by both of the techniques (reverse link interference with mean threshholding selection and geographic distance with Top-X selection) are shown in white (i.e., clear, white cells).

In FIG. 4, a neighborhood size of 13 is illustrated for reverse link interference with mean threshholding selection, and a size of 14 is shown for geographic distance with Top-X selection. Cells chosen exclusively by reverse link interference with mean threshholding are shown as solid elements within a hexagon, and cells chosen exclusively by geographic distance with Top-X selection are solid and enclosed within a triangle.

FIG. 4 illustrates how reverse link interference with mean threshholding selection may provide for a more desirable neighborhood choice for the purposes of configuring a cell for operation in a wireless communication network. For example, reverse link interference with mean threshholding selection ignores the geographically-close cell B because it is directed away from the cell of interest A. In addition, reverse link interference with mean threshholding selection selects a distant cell labeled C, which has high-traffic and interacts significantly with A.

Configuring a Cell Using Neighborhoods

Network optimization problems, distance measures and neighborhood selection criterion having been briefly discussed, methods of configuring a cell for operation in a wireless communication network are described hereafter.

Figure 5A:
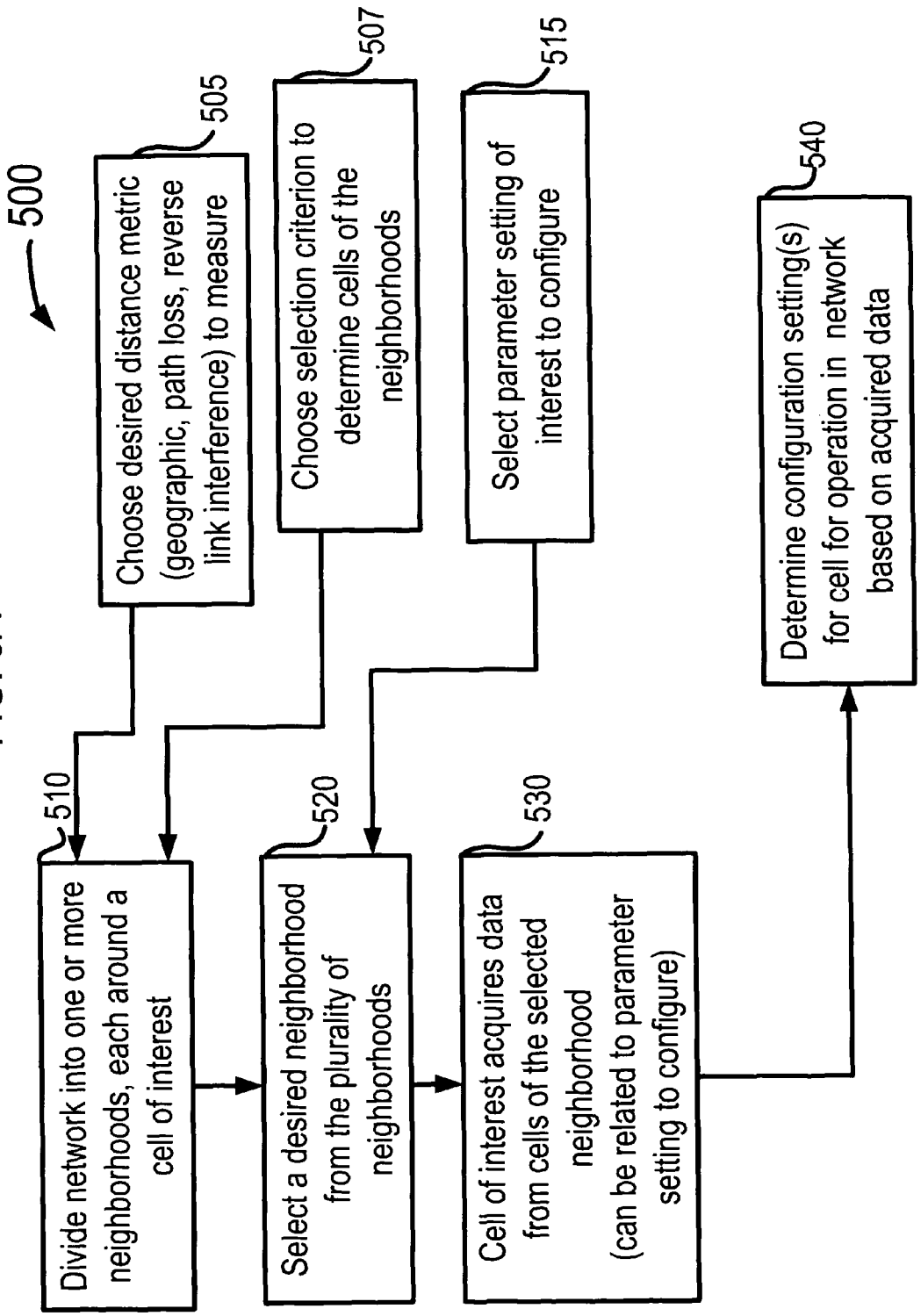
FIG. 5A is a flowchart for describing a method of configuring a cell for operation in a wireless communication network with a determinable neighborhood of cells within the network, in accordance with an example embodiment of the present invention.

FIG. 5A is a flowchart for describing a method of configuring a cell for operation in a wireless communication network with a determinable neighborhood of cells within the network, in accordance with an example embodiment of the present invention. As shown in FIG. 5A, in an example method 500, and in general, for a given cell of interest that needs to be configured for operation in the network, the network may be divided (510) into one or more neighborhoods. As inputs to function 510, the desired distance metric (505) and selection criterion (507) is chosen, as described previously above and as illustrated in FIGS. 1 and 2. A neighborhood may be represented by the given cell to be evaluated (i.e., the cell of interest) and one or more "neighbor" cells of the cell of interest. In some constructions, a neighborhood could include only the cell of interest, i.e., some cells of interest may be determined as having no neighbors. Alternatively, an independent neighborhood can be determined (without first dividing the network into neighborhoods) for the given cell of interest using the selection criteria as described in FIGS. 1 and 2.

In another example, the cell of interest could communicate that it needs to configure a particular parameter (one simple example of a configuration setting being a setting for cell transmit power level), and query the network for a plurality of selectable neighborhoods that could be used for configuring the particular parameter in the cell. In response, the network sends a list of candidate neighborhoods with associated parameter data (e.g., transmit power levels at which the cells in the neighborhood were configured with for operation) to the cell of interest.

In another example, the cell of interest could query a middleman such as an accessible server of the network, or query a service provider and/or another entity associated with the network. The server may have pre-stored neighborhoods associated with particular configuration settings, and could provide a candidate list based on a given parameter to be configured upon being queried by the cell of interest.

From the plurality of neighborhoods, a desired neighborhood may be selected (520), which in an optional example may be based on the desired parameter setting to configure (515), shown as an input to function 520. Various criteria may be employed to select a desired neighborhood from the plurality of selectable neighborhoods, including, but not limited to, via implementation of simulation and optimization, by evaluation of neighborhood quality metrics as reflected by determined coefficient values, etc. As discussed above, a network entity or a given server may be configured to select the desired neighborhood for the cell of interest based on a query received from the cell of interest. In an example, the selected neighborhood may be different for different parameters that need to be configured in the cell of interest for cell operation in the network.

For the selected neighborhood (at 520), which may or may not be representative of the entire network, data may be acquired (530) (in a particular example, data relating to the particular parameter) by the cell of interest. This data may be acquired over the backhaul, over the air interface or via another route, and may originate from either the neighboring cells or from a server accessible by all cells in the selected neighborhood, or from some other source. Based on the acquired data, the given configuration setting(s) are determined (540) for configuring the cell of interest.

Example parameters that may need to be configured for operation ("configuration settings") include but are not limited to settings related to pseudorandom sequence codes (scrambling codes in UMTS), allocation of frequencies (carrier frequencies) for communication, transmit power level, antenna orientation, maximum data rate, maximum number of users, maximum power per user, minimum power per user and pilot power fraction. Some of these parameters may be dynamically configured in the cell during network operation with the cell in the network, as to be described in detail later below. Accordingly, data related to these settings may be acquired from the cells of the neighborhood by the cell of interest, or by a network entity and/or server in communication with the cell of interest.

In another example, data acquired by the cell of interest to determine the desired configuration setting(s) may include live or actual data of the selected neighborhood, which is being monitored by the network or another entity in association with the network. As an example, parameters that may be monitored in the selected neighborhood may in general include service measurements taken of the neighborhood, alarm conditions in the neighborhood, and/or signaling and data information within the neighborhood.

Further examples of parameters that could be monitored as reflective of network status or performance, and which could be used to configure the cell of interest for operation may include, but are not limited to: per-call measurement data for calls originating, terminating or passing through the neighborhood; parameter settings for equipment in the neighborhood (i.e., broadcast power levels, interference levels, signal to noise (Eb/No) ratios, average number of calls, admission control parameters, etc.); settings in the backhaul network for cells in the neighborhood (i.e., IP address settings, source and destination of inter-base station messaging, error rates for backhaul transmission, utilization values for backhaul resources (such as bandwidth), latency values on backhaul); aggregated data for messages passed between cells of the neighborhood (i.e., handoff requests, handoff successes, anchor swaps, values used for maximal ratio combining, etc); results of data acquired at mobiles and relayed back to cells in the neighborhood; total integrated signal strength at the mobile(s), Eb/No value at the mobile(s), frame error rate (FER), mobile transmit power, etc. These parameters are merely exemplary, one of ordinary skill in the art would recognize other feasible parameters to monitor in the neighborhood that could provide data necessary to determine the configuration settings for the cell of interest.

In another example, the results of a given monitoring evaluation may be used to perform an optimization algorithm for selecting a specific desired neighborhood to be used for configuring the cell of interest. Moreover, evaluation may be done on a neighborhood-by-neighborhood basis, instead of on the network as a whole.

An example of a simulation and optimization algorithms may be the iteration of the aforementioned greedy heuristic-based algorithm using one or more of the neighborhoods to optimize network performance. As these examples optimization algorithms are described in detail in the co-pending U.S. patent application Ser. No. 10/325,831 to Abusch-Magder et al., a further explanation thereof is omitted for purposes of brevity.

The implementation for setting the configuration settings in order to configure the cell of interest may be done with human assets or by a combination of human intervention and automated procedures. In another example, the acquired data may serve as an input to an automation algorithm which as an output there from automatically configures the cell of interest based on the input configuration setting data. In another example, the selection of the neighborhood may be used to determine the data which may serve as an input to the automation algorithm which automatically configures the cell of interest as an output thereof.

FIG. 5B is a flowchart for describing a method of dynamically configuring a cell during operation in a wireless communication network with a determinable neighborhood of cells within the network, in accordance with an example embodiment of the present invention. As several of the functions described in FIG. 5A are repeated in FIG. 5B, only the differences are described in detail herein for reasons of brevity.

A network's (or a cell's) environment is constantly changing with time. For example, there may be changes as to the distribution of users in a network or cell, the distribution of required services (voice vs. data, bandwidth requirements, etc.) in a cell or cells, change in call volume, etc. Radio frequency propagation conditions can be changed by weather, season and/or movement of objects in the environment, which may affect required connection time and the mobility of users utilizing the network (e.g., traffic snarls up or becomes clear, etc.). Thus, the configuration of a network or cell may need to be changed based on changes in the environment. For example, a desired cell configuration (such as antenna position, power setting, etc.) for day time may likely be different that evening. Additionally, greater resources will be required where there is a traffic backup. If the network could react to these changes, use of the already deployed resources could be more efficiently utilized in an effort to reduce costs and further expenditures.

For dynamic configuration, cells that are "near" each other may be most important. Dynamically changing certain settings of a given cell of interest may also require changes to the neighbors (rather than distant cells); this should be avoided. Thus, a wise choice of a cell's neighborhood may reduce resource expenditures in the process of dynamically configuring or adjusting given settings of the cell of interest.

Referring to FIG. 5B, in an example method 500A, a given neighborhood for a given cell of interest to be re-configured during network operation may be selected (510A), either from a plurality of selected neighborhoods or independently determined using the methodology described in FIGS. 1 and 2, for example, or based on a parameter of interest to configure. For purposes of brevity and clarity, functions 505, 507 and 510 are omitted in FIG. 5B. As previously described in FIG. 5A, and based on a given parameter to be configured the selected neighborhood can be determined by an accessible server of the network, the service provider and/or another entity associated with the network, or by the cell itself.

In an example, the selected neighborhood may be different for different parameters that need to be configured in the cell of interest for cell operation in the network. Further as discussed above, various other criteria may be used for neighborhood selection such as by implementation of simulation and optimization, by evaluation of neighborhood quality metrics as reflected by determined coefficient values, etc.

Data (such as data relating to the particular parameter to be dynamically re-configured or adjusted) may be acquired (520A) from neighboring cells by the cell of interest over the backhaul, air interface, or via another route, and may originate from either the neighboring cells or from a server accessible by all cells in the selected neighborhood, or from some other source. Example parameters that due to changes in the network's environment may need to be dynamically re-configured or adjusted on-the-fly during cell operation include one or more of transmit power level, antenna orientation, maximum data rate, maximum number of users, maximum power per user, minimum power per user and pilot power fraction.

The acquisition of data from cells of the selected neighborhood requires exchanging information between the neighborhood cells and the cell of interest. In one example, the cell of interest queries the neighborhood cells for specified parameter data related to conditions of the network. In response to the query, the cells of the neighborhood perform given measurements to acquire the requested data for transmission to the given cell of interest. Example conditions of the network to be measured by the neighbor cells may be related to operating conditions and environmental conditions of the network. Example operating and/or environmental condition may include but are not limited to user distribution, call volume, radio frequency propagation conditions, connection time, user mobility characteristics and time of day.

In another example, the acquired data may include data from sources other than from the cells of the neighborhood or from live monitoring data of the neighborhood or network. Other example sources of data may include network-wide change data and traffic report data from the network, or data acquired from outside the network (for example, from traffic light settings or other road traffic conditions).

Accordingly, data related to these settings are acquired from the cells of the neighborhood by the cell of interest, or by a network entity and/or server in communication with the cell of interest. Based on the acquired data, the given parameter setting(s) is adjusted (530A), thus dynamically configuring the cell of interest in real time during cell operation in the network.

As described above, live data of the selected neighborhood may be acquired to adjust the parameter settings. The results of a given monitoring evaluation may be used to perform an optimization algorithm for selecting a specific desired neighborhood to be used for dynamically configuring one or more parameters the cell of interest, on a neighborhood-by-neighborhood basis or based on the network as a whole.

The implementation for dynamically changing the parameters settings of the cell of interest may be done with human assets, or with a combination of human intervention and automated procedures. In another example, the acquired data may serve as an input to an automation algorithm which automatically configures the cell of interest based on the input setting data. In another example, the selection of the neighborhood may be used to determine the data to acquire, which serves as an input to the automation algorithm to automatically re-configure or adjust a setting of the cell of interest as an output thereof.

In each of FIGS. 5A and 5B, the illustrated cell configuration/dynamic configuration necessarily includes obtaining the communication bandwidth required to negotiate the new/adjusted parameter settings. Accordingly, in order to acquire the data for determining/adjusting parameter settings of the cell of interest, bandwidth for communication of the data between the neighborhood cells and the given cell of interest should be properly allocated.

In one example, spectrum management can be handled by the service provider or a network entity thereof. In another example, a centralized entity known as a regional spectrum broker can control access to the spectrum in the region containing the neighborhood. In the case where a spectrum broker is used, the service providers do not apriori own any spectrum; instead they obtain time bound rights from a regional spectrum broker to part of the spectrum and configure it to offer a given network service, for example. As coordinated Dynamic Spectrum Access (DSA) Networks employing a regional service broker are still in development, use of a spectrum broker may be possible with the advent of new technologies in the form of coordination, signaling protocols, network elements and client devices, for example.

Figure 6:
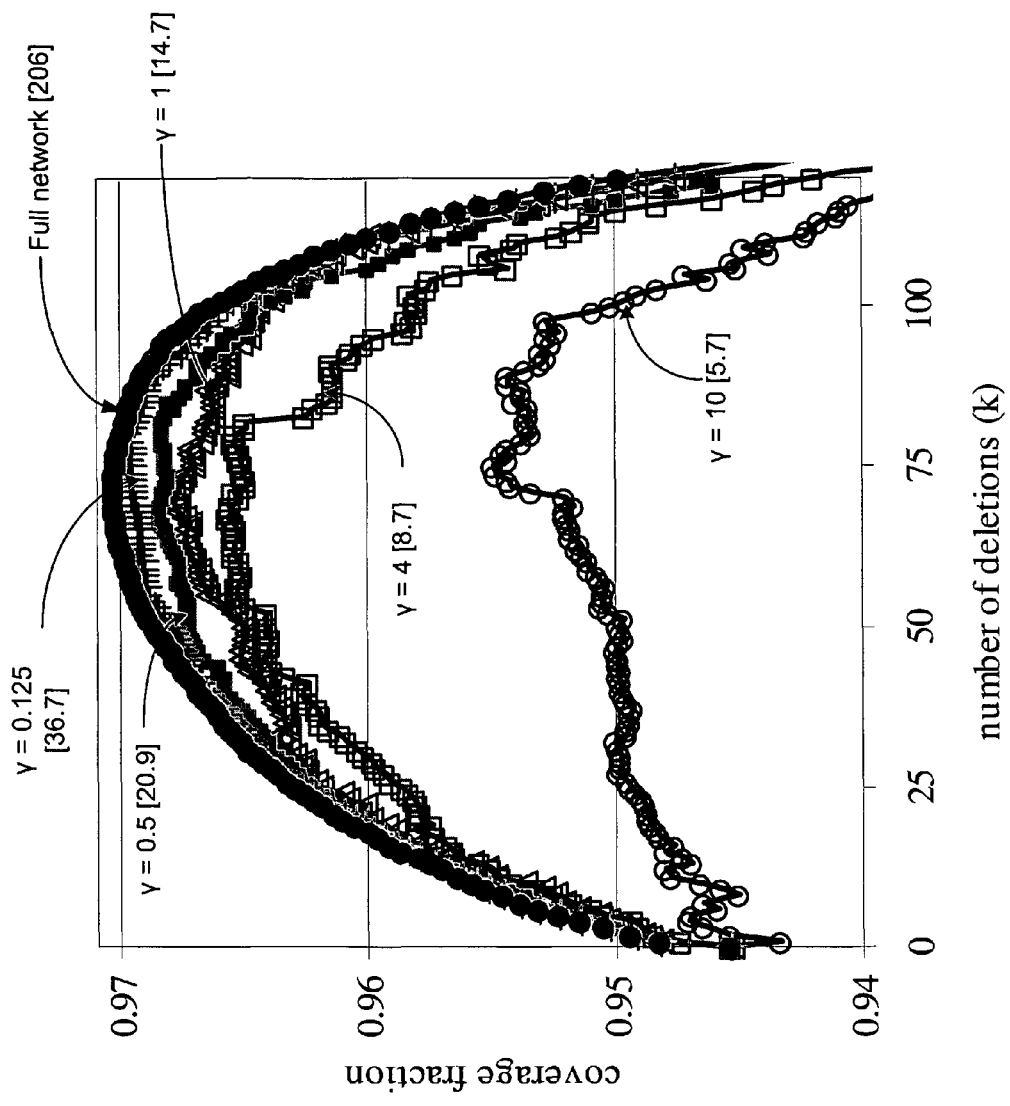
FIG. 6 illustrates simulated network performance using reverse link interference with mean threshold selection to obtain neighborhoods of different sizes on a realistic over-designed 206-cell network.

Methods of configuring a cell for operation and for dynamically configuring a cell that is operating in a network having been described, the inventor has investigated the use of a reverse link interference threshholding criterion to select cells of neighborhoods through simulation. FIG. 6 illustrates reverse link interference with mean threshholding selection on a realistic over-designed 206-cell network. As discussed above, the parameter $\gamma$ represents a multiple of the linear mean of interference power for each cell. There are six (6) curves shown in FIG. 6. Referring from top to bottom (where average neighborhood size on the first iteration of the greedy cell deletion algorithm is indicated in brackets), the six curves are shown as: full network evaluation [all 206 cells] (see the "solid circle" curve), $\gamma=0.125$ [36.7] (vertical line curve), $\gamma=0.5$ [20.9] (solid square curve), $\gamma=1$ [14.7] (hollow triangle), $\gamma=4$ [8.7] (hollow square) and $\gamma=10$ [5.7] (hollow circle).

In FIG. 6, the $\gamma=0.125$ curve closely approximates the full-evaluation curve even though the $\gamma=0.125$ average neighborhood size is almost 6 times smaller (206 vs. 36.7 cells). Coverage increases in initial deletions because the network is over-designed and has too many cells. The resulting interference degrades the coverage. As cells are removed the interference decreases and coverage increases. After removing approximately 70 cells, the deletion of cells begins to reduce the overall coverage.

As FIG. 6 shows, locality-greedy runs produced results of similar quality as compared to conventional-greedy runs. For example, results comparable to full-evaluation greedy on a realistic 206-cell network were obtained using an average neighborhood size of 36.7. This simplification provided an algorithm runtime that was roughly 15 times faster than the conventional full-evaluation method, respectively.

FIGS. 7A-7D illustrates correlations between changes in cell coverage ($\Delta$coverage) for a full network evaluation and for a neighborhood evaluation after the first iteration of the greedy cell deletion algorithm.

A judicious choice of neighbors surrounding the cell of interest enables capturing the behavior of the network in the vicinity of the cell of interest with fewer resources than would be required using conventional techniques, which typically may select a poor choice of neighbors, which in turn aids in cell configuration. To help guide this choice and to gain perspective as to the robustness of the locality approximation and the utility of neighborhoods, in FIGS. 7A-7D the inventor has examined the change in coverage ($\Delta$coverage) after the initial deletion of each candidate cell in the same 206-cell realistic network. The $\Delta$coverage was plotted as computed by a full evaluation versus $\Delta$coverage as computed by a neighborhood evaluation, and a correlation coefficient between the two was examined.

A high degree of correlations, i.e., a correlation coefficient value that is closer to 1, indicates improved accuracy. The neighborhood size needed to obtain results comparable to full-network simulation does not scale proportionately to network size; instead, it remains roughly constant. Thus, the benefits possible in configuration, monitoring, or simulation introduced by locality may increase with greater network size.

In FIGS. 7A-7D, charts in the same row (7A and 7B, 7C and 7D) correspond to the same neighborhood method but different neighborhood sizes, while charts in the same column (7A and 7C, 7B and 7D) have approximately the same average neighborhood size but use different threshholding techniques and distance measures to determine the neighborhood. Average neighborhood size on the first iteration, indicated in brackets, increases from left to right. The correlation coefficient, and therefore accuracy of the locality simplification, increases as neighborhood size increases. For fixed neighborhood size, reverse link interference with mean threshholding selection has a greater correlation than geographic distance with Top-X selection.

Figure 7A:
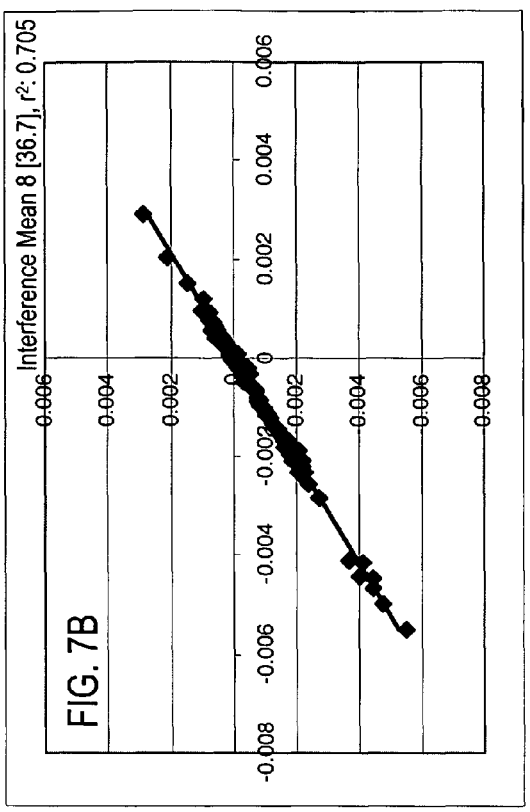
FIGS. 7A-7D illustrate correlations in the change in cell coverage (Δcoverage) based on full network and neighborhood simulator after the first iteration of an example greedy cell deletion algorithm.
Figure 7B:
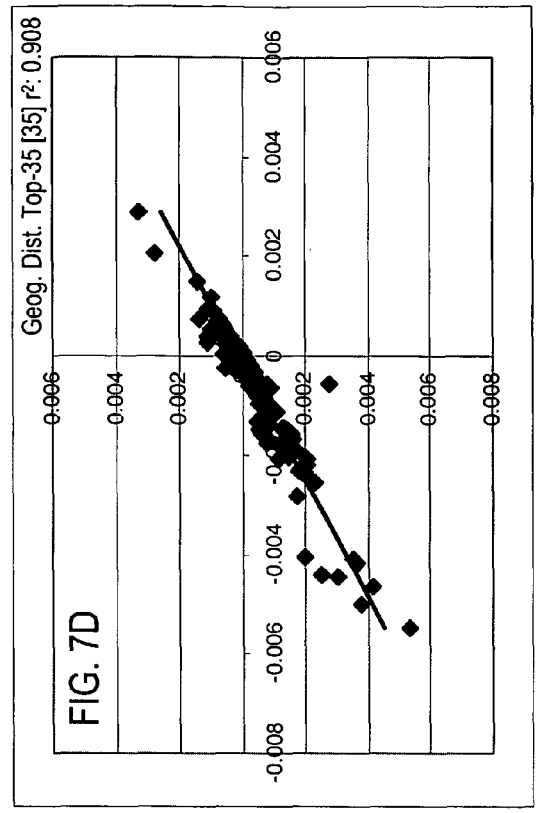
Figure 7C:
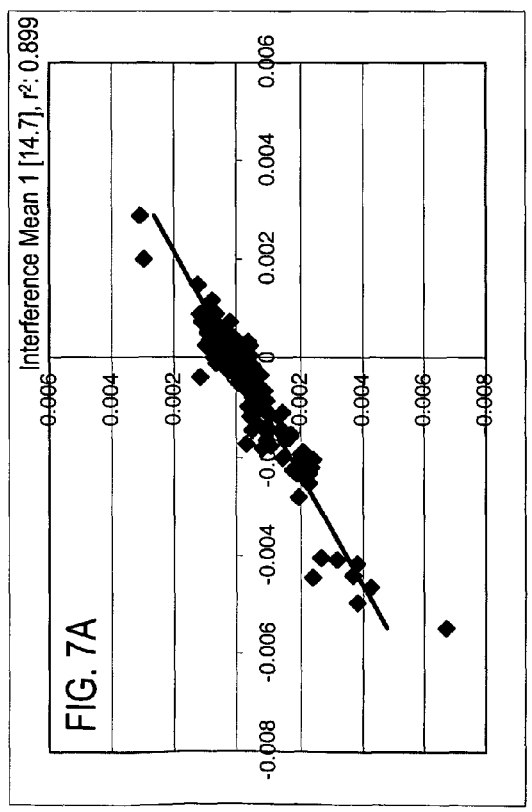
Figure 7D:
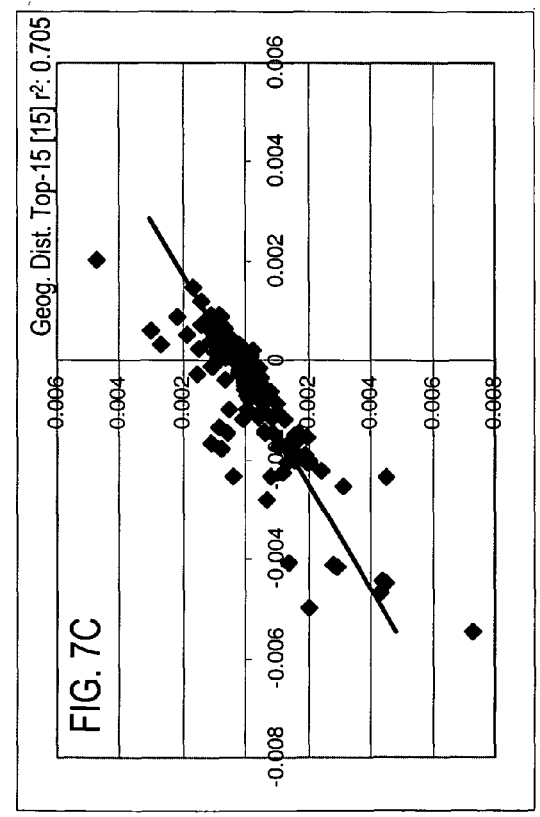

As shown in FIG. 7B, the inventor was able to obtain a near-perfect correlation between the two values when using reverse link interference with mean threshholding selection with an average neighborhood size of 36.7, further underscoring the ability of using the example neighborhood simplification techniques to obtain accurate results. Similar methodologies based on simulation runs could be used to determine desirable neighborhood selection parameters for cell configuration.

Choice of Distance Measure and Selection Criterion Affects Quality of Data

Figure 8:
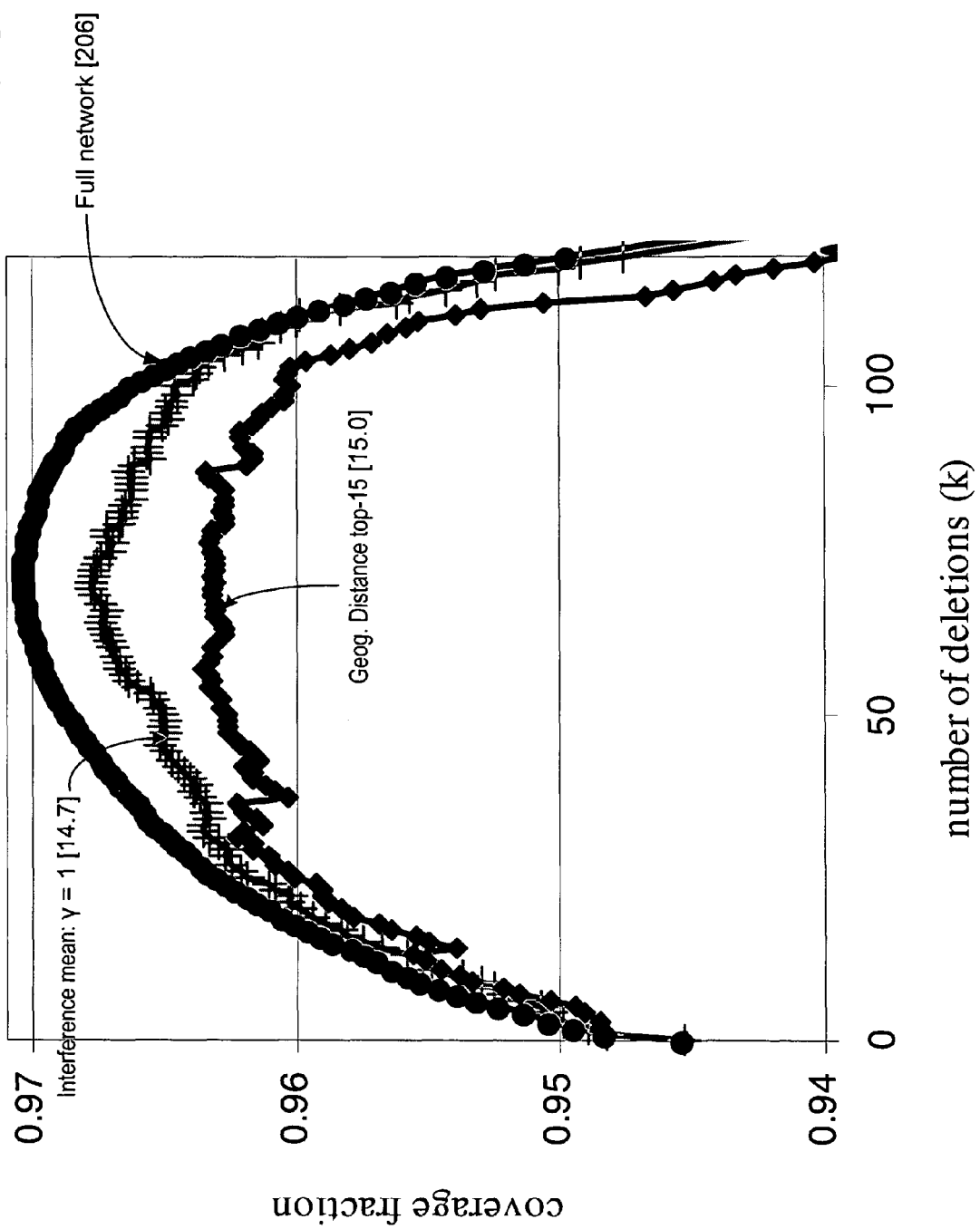
FIG. 8 is a graph illustrating a comparison of the simulated performance of the greedy cell deletion algorithm for neighborhoods determined by reverse link interference with mean threshholding selection versus neighborhoods determined by geographic distance with Top-X selection.

FIG. 8 is a graph illustrating a comparison of the use of a greedy algorithm with neighborhoods determined by reverse link interference with mean threshholding selection versus neighborhoods determined by geographic distance with Top-X selection. In FIG. 8, greedy deletion runs on a 206-cell realistic network using different neighborhood definitions. Top to bottom (average neighborhood size on first iteration in brackets): full [206], interference mean with $\gamma=1$ [14.7], geographic distance with top-15 [15]. Even though both neighborhood selection criteria have comparable neighborhood sizes (14.7 and 15), the reverse link interference with mean threshholding selection algorithm for neighborhood determination performs substantially better because it selects neighbors in a generally more intelligent manner (as suggested by FIGS. 7A-7D).

Accordingly, the choice of distance measure or threshholding can have a significant impact on the performance of the neighborhood simplification. In FIG. 8, even though both simulation runs had approximately the same average neighborhood size, the reverse link interference with mean threshholding selection run showed significantly better results.

FIGS. 7A-7D may further illustrate the importance of the choice of selection criterion for neighborhood determination. In comparing the $\Delta$coverage correlation graphs of similar-sized neighborhoods generated using reverse link interference with mean threshholding selection and geographic distance with Top-X selection, FIGS. 7A-7D clearly show stronger correlations in the reverse link interference with mean threshholding selection neighborhoods.

The interference-based method performs better because it generates neighborhoods more intelligently: it is able to include geographically-distant cells that have high interactions with the cell of interest while ignoring geographically-near cells that do not have much interaction. For example, as FIG. 4 shows, cell B is geographically close to A, the cell of interest, but B is also low-traffic and directed away from A. On the other hand, cell C is relatively far away from B, but C has high-traffic and is omni-directional. Reverse link interference with mean threshholding selection includes C but not B, while geographic distance with Top-X selection includes B but not C—the former is the preferred choice in this situation.

The above example demonstrates how the judicious choice of neighborhood might improve the quality of acquiring data for configuring the cell of interest, or alternatively how to reduce the size of the neighborhood and the concomitant costs while maintaining the quality of the data gathered for configuring the cell of interest. Accordingly, use of neighborhoods may more accurately capture a network's interaction and therefore may be desirable for cell configuration.

Choice of Neighborhood Size Affects Accuracy and Efficiency

The choice of a neighborhood should be viewed in the context of a cost/benefit analysis for gathering data, such as through live monitoring of the selected neighborhood, in order to configure the cell of interest. For example, larger neighborhoods cost more to monitor and/or configure (due to equipment, computational resources such as storage and processing servers, increase in communication on backhaul etc.), while smaller neighborhoods might be less accurate. Accordingly, a judicious choice of neighborhood is desired, where the quality of the data gathered may be increased for the same number of cells, or where the quality of data is maintained with a reduction in the number of well chosen cells.

Additionally, neighborhood size determination presents a trade-off in simulations between accuracy and efficiency. As shown in FIG. 6, simplifications with larger neighborhood sizes generally produce more accurate results. However, the inaccuracy decreases as neighborhood size increases because one can obtain results similar to full-evaluation solutions using a relatively small neighborhood size. The size required for results that agree with full-network evaluation may depend on the market details, but once the neighborhood is large enough to capture the behavior of the network, increasing neighborhood size simply adds cells and computation while introducing little benefit.

Therefore, a judicious choice of neighborhood in simulation may help guide the choice for a given neighborhood to set parameters for configuring a cell in the network. However, more fundamentally, the same cost-benefit balance exists in choosing neighborhoods for cell configuration: too many cells in the neighborhood and the configuration costs are unnecessarily high, too few cells and the quality of the data obtained for determining the configuration settings might suffer.

Neighborhoods may be used in order to assess neighborhood quality for determining a particular configuration setting for the cell of interest. For example, dividing networks into neighborhoods around cells of interest could be used in assessing the size of a neighborhood required for adequate accuracy in one or more parameters to be configured in the cell of interest. Such a procedure may be employed to see how robust the selected neighborhood is, and/or to efficiently determine the quality of the neighborhood for one or more specified parameters to be configured for the cell of interest. This may also help to conserve processing resources, since one can check a selected neighborhood's robustness characteristics in advance, prior to using the neighborhood for gathering specified information for determining the configuration settings (parameters) for the cell of interest.

As an example, a measurement could be made of certain events (for example call attempts) that coincide with an event in the cell of interest (for example a call failure). A parameter such as the number of such coincident events per minute may represent a parameter measure to be determined on a local scale, e.g., for a given neighborhood. A similar parameter could be measured on a global scale, e.g. for the entire network or for a larger neighborhood. The number of events in the neighborhood may be the number of failures in the cell of interest that are coincident with call attempts in the neighborhood (instead of in the network or larger neighborhood as a whole).

To test the quality of a neighborhood to be selected for use in cell configuration, a correlation coefficient may be computed based on the measured parameters for the network version and the neighborhood version, in an effort to determine how well the neighborhood captured such events, and hence, may provide a relative indication of the quality or robustness of the evaluated neighborhood. The neighborhood with the highest absolute value of its coefficient may be selected as the neighborhood to be used for configuring the chosen parameter(s) of the cell of interest. Alternatively, one may measure the desirability of a neighborhood for cell configuration based on a combination of a function of the correlation coefficient and the cost to configure the cell of interest in that particular neighborhood. The neighborhood with a desired combined score may then be chosen; in this way one can balance the cost and benefit of different possible neighborhood choices.

Given the trade-off between configuration costs and accuracy and between simulation accuracy and efficiency, one might wonder how, given a network, one could select an accurate distance measure and/or neighborhood definition. One method for guiding neighborhood size decisions is illustrated by the correlation graphs of FIGS. 7A-7D. Similarly the correlation of first-iteration locality-greedy and conventional-greedy $\Delta$coverage may be a relatively accurate predictor of overall locality-greedy performance.

The correlation method can be applied directly to a variety of measurement operations. The limited single-iteration samplings proposed herein can be chosen to require insignificant resources relative to a full conventional run. For example, the correlation between coincident events as measure globally and for different neighborhood definitions can serve to guide the appropriate selection of neighborhood definitions. These measurements, when carried out for a limited time or for a limited subset of correlated events, may be a cost effective way of assessing the utility of a neighborhood definition for cell configuration.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of configuring a cell for operation in a wireless communication system where user terminals communicate over an air interface with a network side of the system, the system having a determinable neighborhood of cells, comprising:
    selecting, by an element on the network side of a given cell to be configured, a neighborhood of cells relative to the given cell, the selecting being based on,
        measuring reverse link interference values at the given cell for mobiles owned by or in communication with another cell, the another cell being part of a same neighborhood as the given cell or not part of the same neighborhood as the given cell,
        comparing the reverse link interference values at the given cell to a threshold, the threshold being based on a multiple of a linear mean of interference power at the given cell, and
        selecting cells for which a corresponding reverse link interference value exceeds the threshold as cells of the neighborhood of the given cell;
    acquiring, by the element on the network side, data from the selected neighborhood; and
    determining, by the element on the network side, network side operating configuration settings for the given cell based on the acquired data, the network side operating configuration settings being network side parameters for operating the given cell.

2. The method of claim 1, further comprising:
inputting the acquired data into an auto-configuration algorithm that determines settings for initial operation and automatically sets the configuration settings in the given cell as an output from the algorithm.

3. The method of claim 1, wherein the acquired data from the neighborhood of cells includes one or more of pseudorandom sequence codes, allocation of frequencies for communication, transmit power level, antenna orientation, maximum data rate, maximum number of users, maximum power per user, minimum power per user and pilot power fraction.

4. The method of claim 1, wherein the measured reverse link measurements are actual measurements of reverse link interference at the cell or predicted measurements based on simulation of the network.

5. A method of configuring a cell for operation in a wireless communication system where user terminals communicate over an air interface with a network side of the system, the system having a determinable neighborhood of cells, comprising:
selecting, by an element on the network side of a given cell to be configured, a neighborhood of cells relative to the given cell, the selecting being based on,
determining a score for other cells based on a function of a geographic distance of the other cells from the given cell, and
ranking a given number of cells that are closest to the given cell based on a chosen ranking criterion, the closest X cells being selected as belonging to the neighborhood;
acquiring, by the element on the network side, data from the selected neighborhood; and
determining, by the element on the network side, network side operating configuration settings for the given cell based on the acquired data, the network side operating configuration settings being network side parameters for operating the given cell.

6. The method of claim 5, wherein the value of X is variable based on a structure of the network to be simulated.

7. The method of claim 1, wherein the selecting of a given neighborhood differs for a given setting or parameter to be configured in the given cell.

8. The method of claim 1, wherein the acquiring the data further includes the given cell acquiring the data from a data server.

9. The method of claim 1, wherein the selecting the neighborhood further includes a data server in communication with the given cell and the network selecting the neighborhood and communicating same to the given cell.

10. A method of configuring a cell for operation in a wireless communication system where user terminals communicate over an air interface with a network side of the system, the system having a determinable neighborhood of cells, comprising:
selecting, by an element on the network side of a given cell to be configured, a neighborhood of cells relative to the given cell based on a particular parameter to be configured for the given cell, by the element on the network side, the selecting being based on
selecting one of a plurality of selectable neighborhoods as a function of a correlation coefficient, a value of which is indicative of a quality of the neighborhood,
performing one of a simulation and a measurement for each neighborhood to determine a first parameter for each neighborhood,
performing one of a simulation and a measurement of one of the entire network or a larger neighborhood to determine a second parameter,
determining a correlation coefficient between the first and second parameters, a value of the correlation coefficient indicative of the quality of the neighborhood for cell configuration, and
selecting the neighborhood with a highest absolute value of its coefficient as the neighborhood to be used for configuring the given cell;
acquiring, by the element on the network side, data from cells of the selected neighborhood that is related to the particular parameter to be configured for the given cell; and
configuring, by the element on the network side, network side operating settings for the given cell based on the acquired data, the network side operating configuration settings being network side parameters for operating the given cell.

11. The method of claim 10, wherein the particular parameter to be configured and the acquired data from the neighborhood cells includes one or more of pseudorandom sequence codes, allocation of frequencies for communication, transmit power level, antenna orientation, maximum data rate, maximum number of users, maximum power per user, minimum power per user and pilot power fraction.

12. The method of claim 10, further comprising: allocating bandwidth for communication of the data between the neighborhood cells and the given cell.

13. A method of dynamically configuring a cell during operation in a wireless communication system where user terminals communicate over an air interface with a network side of the system, the system having a determinable neighborhood of cells, comprising:
selecting, by an element on the network side of a given cell to be configured, a neighborhood of cells relative to the given cell, the selecting being based on measuring path loss between said network element and two or more points in a vicinity of another cell by comparing received signal power from the network-side element at the two or more points in the vicinity of the other cell;
acquiring, by the element on the network side, data for configuration, from cells of the selected neighborhood by querying the neighborhood cells for specified data related to conditions of the network, the cells of the neighborhood performing given measurements to acquire the requested data for transmission to the given cell, and
adjusting, by the element on the network side, one or more network side operating configuration settings of the given cell based on the acquired data, the network side operating configuration settings being network side parameters for operating the given cell.

14. The method of claim 13, wherein the conditions of the network to be measured are related to operating conditions and environmental conditions of the network including one or more of user distribution, call volume, radio frequency propagation conditions, connection time, user mobility characteristics and time of day.

15. The method of claim 13, further comprising:
acquiring data from sources other than the cells of the neighborhood.

16. The method of claim 13, wherein the adjusting one or more configuration settings of the given cell includes changing one or more settings related to the given cell's transmit power level, antenna orientation, maximum data rate, maximum number of users, maximum power per user, minimum power per user and pilot power fraction.

17. The method of claim 13, wherein the selecting of a given neighborhood differs for a given configuration setting or parameter to be adjusted in the given cell.

18. The method of claim 13, further comprising:
inputting the acquired data into an auto-configuration algorithm that determines the adjustments to the configuration settings and automatically adjusts the configuration settings in the given cell as an output from the algorithm.

19. The method of claim 13, wherein the acquiring the data further includes the given cell acquiring the data from a data server.

20. The method of claim 13, wherein the selecting the neighborhood further includes a data server in communication with the given cell and the network selecting the neighborhood and communicating same to the given cell.

21. The method of claim 1, further comprising:
determining network side operating configuration settings for the element on the network side based on the acquired data.

22. The method of claim 10, further comprising:
determining network side operating configuration settings for the element on the network side based on the acquired data.

23. The method of claim 13, further comprising:
adjusting one or more network side operating configuration settings of the element on the network side based on the acquired data.

24. The method of claim 1, wherein the selecting the neighborhood further includes:
measuring path loss between said network element and two or more points in a vicinity of another cell by comparing received signal power from the network-side element at the two or more points in the vicinity of the other cell;
determining a score for other cells based on the path loss of the points in their vicinity, and
selecting cells based on corresponding scores as cells of the neighborhood.

25. The method of claim 10, wherein the selecting further includes selecting the neighborhood as a function of configuration costs in addition to the correlation coefficient.

26. The method of claim 10, wherein the first and second parameters are a same measured or simulated parameter, the first parameter measured or simulated on a local, neighborhood scale, the second parameter measured or simulated on a global network scale or larger neighborhood scale.

* * * * *